United States Patent
Kumar et al.

(10) Patent No.: US 11,573,943 B2
(45) Date of Patent: Feb. 7, 2023

(54) SYSTEM AND METHOD FOR DATA RECONCILIATION

(71) Applicant: Datametica Solutions Pvt Ltd, Pune (IN)

(72) Inventors: Niraj Kumar, Pune (IN); Suyog Jadhav, Pune (IN); Surinder Pal Singh Bindra, Pune (IN)

(73) Assignee: Datametica Solutions Pvt Ltd

( * ) Notice: Subject to any disclaimer, the term of this patent is extended or adjusted under 35 U.S.C. 154(b) by 171 days.

(21) Appl. No.: 16/890,106

(22) Filed: Jun. 2, 2020

(65) Prior Publication Data
US 2020/0401569 A1    Dec. 24, 2020

(30) Foreign Application Priority Data
May 21, 2020   (WO) ............... PCT/IB2020/054830

(51) Int. Cl.
*G06F 16/22*    (2019.01)
*G06F 9/48*     (2006.01)
(Continued)

(52) U.S. Cl.
CPC ........ *G06F 16/2255* (2019.01); *G06F 9/4881* (2013.01); *G06F 16/2282* (2019.01);
(Continued)

(58) Field of Classification Search
CPC .. G06F 16/2255; G06F 16/2365; G06F 21/64; G06F 16/137
See application file for complete search history.

(56) References Cited

U.S. PATENT DOCUMENTS 6,098,079 A    8/2000   Howard
7,484,096 B1 *  1/2009   Garg ............... H04L 9/3247
                                                   713/176
(Continued)

FOREIGN PATENT DOCUMENTS

WO    2004070625 A1    8/2004
WO    2014000825 A1    1/2014

OTHER PUBLICATIONS

Chen et al. "Verifying Data Migration Correctness: the Checksum Principle", RTI Press, Mar. 2014.*

*Primary Examiner* — Etienne P Leroux
*Assistant Examiner* — Cindy Nguyen
(74) *Attorney, Agent, or Firm* — Jason C. Cameron

(57) ABSTRACT

A system for data reconciliation is provided. The data reconciliation system includes a data processing subsystem. The data processing subsystem includes a computation module, configured to generate hash values for a set of tables located in a source database by a hashing technique and also configured generate hash values for a set of tables located in a destination database by the hashing technique. The data processing subsystem also includes an analysis module, configured to analyse the hash values located in the source database and the hash values located in the destination database by a pre-determined rule. The data processing subsystem also includes a suggestion module, configured to suggest output based on the analysis result. A data memory subsystem is configured to store the generated hash values for the source database and the generated hash values for the destination database. Present invention provides safe migration or transferring of data.

9 Claims, 4 Drawing Sheets

(51) Int. Cl.
*G06F 16/332* (2019.01)
*G06F 16/27* (2019.01)
*G06F 16/2455* (2019.01)

(52) U.S. Cl.
CPC ...... *G06F 16/24564* (2019.01); *G06F 16/273* (2019.01); *G06F 16/3322* (2019.01)

(56) References Cited

U.S. PATENT DOCUMENTS

2016/0063050 A1* 3/2016 Schoen ................. G06F 16/214
707/690
2017/0277698 A1* 9/2017 Heard ................... G06F 16/137
2018/0276216 A1 9/2018 Anderson et al.

* cited by examiner

SYSTEM AND METHOD FOR DATA RECONCILIATION

This International Application claims priority from a complete patent application filed in India having Patent Application No. 201921024773, filed on Jun. 21, 2019 and titled "SYSTEM AND METHOD FOR DATA RECONCILIATION"

FIELD OF INVENTION

Embodiments of a present disclosure relates to maintaining of one or more table values for a number of tables in a database system and more particularly to a system for data reconciliation of a table in a data base system and a method to operate the same.

BACKGROUND

Information in database systems is stored based on tables comprising data entries for a plurality of rows and at least one column. A database is an organized collection of data, generally stored and accessed electronically from a computer system. While transferring data from one database system to another database system data may go missing or may get replicated unnecessarily. Such situations happen quite often, for example data is replicated when transferring of data takes place from one database system to another database systems. There is always a need to compare the transferred data in an easy and efficient manner. Such comparisons become more complicated if a source database and a destination database is located in two different data stores. A data store is a repository for persistently storing and managing collections of data which include not just repositories like databases, but also simpler store types such as simple files, emails etc.

In one approach, a system uses hashing techniques for comparing data of two databases. Such comparing of datasets enable usage of limited hashing techniques to find provide results. More efficient approach would be to use different hashing techniques for comparing set of data stored in tables of two databases. Moreover, such system should also enable comparing a source database and a destination database is located in two different data stores.

Further, a system would be more efficient if any attributes like samples of faults in the replicated data or a root cause analysis of the replicated data is provided along with the analysed result. Thereby, manual effort of a user may be reduced to certain extent.

Hence, there is a need for an improved system for data reconciliation and a method to operate the same and therefore address the aforementioned issues.

BRIEF DESCRIPTION

In accordance with one embodiment of the disclosure, a system for data reconciliation is provided. The data reconciliation system includes a data processing subsystem. The data processing subsystem includes a computation module. The computation module is configured to generate hash values for a set of tables located in a source database by a hashing technique. The computation module is also configured generate hash values for a set of tables located in a destination database by the hashing technique.

A data memory subsystem is operatively coupled to the data processing subsystem. The data processing subsystem is configured to store the generated hash values for the source database and the generated hash values for the destination database.

The data processing subsystem also includes an analysis module. The analysis module is operatively coupled to the computation module. The analysis module is configured to analyse the hash values located in the source database and the hash values located in the destination database by a pre-determined rule. The data processing subsystem also includes a suggestion module. The suggestion module is operatively coupled to the analysis module. The suggestion module is configured to suggest output based on the analysis result.

In accordance with one embodiment of the disclosure, a method for data reconciliation is provided. The method includes generating hash values for a set of tables located in a source database by a hashing technique. The method also includes generating hash values for a set of tables located in a destination database by the hashing technique.

The method also includes analysing the hash values located in the source database and the hash values located in the destination database by a pre-determined rule. The method also includes suggesting output based on the analysis result.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
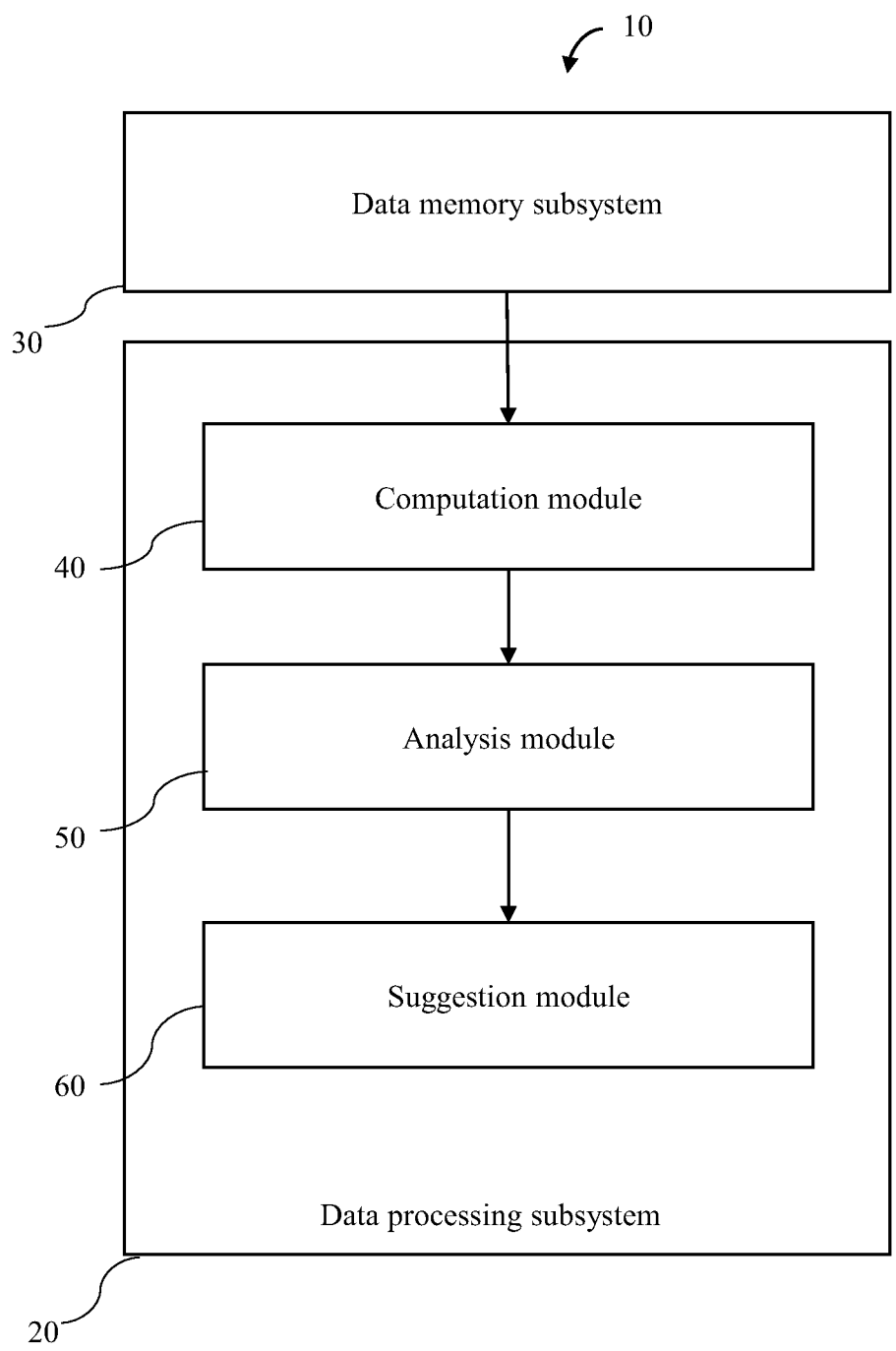
FIG. 1 is a block diagram representation of a system for data reconciliation in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for data reconciliation. The data reconciliation system includes a data processing subsystem. The data processing subsystem includes a computation module. The computation module is configured to generate hash values for a set of tables located in a source database by a hashing technique. The computation module is also configured generate hash values for a set of tables located in a destination database by the hashing technique.

A data memory subsystem is operatively coupled to the data processing subsystem. The data processing subsystem is configured to store the generated hash values for the source database and the generated hash values for the destination database.

The data processing subsystem also includes an analysis module. The analysis module is operatively coupled to the computation module. The analysis module is configured to analyse the hash values located in the source database and the hash values located in the destination database by a pre-determined rule. The data processing subsystem also includes a suggestion module. The suggestion module is operatively coupled to the analysis module. The suggestion module is configured to suggest output based on the analysis result.

FIG. 1 is a block diagram representation of a system for data reconciliation 10 in accordance with an embodiment of the present disclosure. As used herein, the term "Data Reconciliation (DR)" is a term used to describe a verification phase during a data migration where the target data is compared against original source data to ensure that the migration architecture has transferred the data correctly.

As used herein, the term "data store" is a repository for persistently storing and managing collections of data which include not just repositories like databases, but also simpler store types such as simple files, emails etc. In such embodiment, the database refers to collection off data's in columns and rows.

In one embodiment, the source data store represents the place from where data is to be migrated. In such embodiment, the target data store represents the place to which data is to be migrated.

The system for data reconciliation 10 includes a data processing subsystem 20. The data processing subsystem 20 includes a computation module 40. The computation module 40 is configured to generate hash values for a set of tables located in a source database by a hashing technique.

As used herein, the term "hashing" is the transformation of a string of characters into a usually shorter fixed-length value or key that represents the original string. As used herein, the term "hash value" is a numeric value of a fixed length that uniquely identifies data. In one embodiment, the set of tables include created or migrated rows and columns.

In one alternative embodiment, the hashing techniques also include at least one of SHA-1, SHA-2, SHA-3, MD5 and the like. As used herein, the term "SHA-1 (Secure Hash Algorithm 1)" refers to a cryptographic hash function which takes an input and produces a 160-bit (20-byte) hash value known as a message digest—typically rendered as a hexadecimal number, 40 digits long.

As used herein, the term "MD5 message-digest" refers to a technique widely used hash function producing a 128-bit hash value. In another embodiment, computing fingerprinting may be used for hashing technique. As used herein, the term "fingerprinting" is a procedure that maps an arbitrarily large data item (such as a computer file) to a much shorter bit string, its fingerprint, that uniquely identifies the original data for all practical purposes. Such fingerprint may be used for data deduplication purposes.

In one exemplary embodiment, firstly all columns of one single row is concatenated into a varchar. The varchar of the columns is then converted into a hash value. Secondly, for all rows one aggregated hash value is calculated. Here, the hash value at various steps is calculated by usage of hashing techniques. In such embodiment, the final aggregated hash value is used for comparison or any other analysis.

As used herein, the term "column" is a set of data values of a simple type, one value for each row of the database. As used herein, the term "row" in a table represents a set of related data, and every row in the table has the same structure. As used herein, the term "varchar" refers to a data type of a field (or column) in a Database Management System which can hold letters and numbers. As used herein, "concatenate" refers linking data together in a series, or the condition of being linked in a particular way.

Moreover, the computation module 40 is also configured to generate hash values for a set of tables located in a destination database by the hashing technique. Here, in such exemplary embodiment, firstly all columns of one single row is concatenated into a varchar. The varchar of the columns is then converted into a hash value. Secondly, all rows one aggregated hash value is calculated. Here, the hash value at various steps is calculated by usage of hashing techniques. In such embodiment, the final aggregated hash value is used for comparison or any other analysis.

A data memory subsystem 30 is operatively coupled to the data processing subsystem 20. The data memory subsystem 30 is configured to store the generated hash values for the source database and the generated hash values for the destination database. In one embodiment, the storing may be performed in a remote storage or a local storage. In another embodiment, the system allows regular update according to the input from a user of database.

The data processing subsystem 20 also includes an analysis module 50. The analysis module is operatively coupled to the computation module. The analysis module 50 is configured to analyse the hash values located in the source database and the hash values located in the destination database by a pre-determined rule. In one embodiment, the two databases as discussed may be located at different data stores. Such datastores includes at least one of TEREDATA, NETEZZA, and the like.

In one embodiment, the pre-determined rule as required for analysis comprises of scheduler information and mapping details from a user. In one such embodiment, the analysis may be performed on the two set of hash values at a scheduled timeline.

In another such embodiment, various mapping details related to different analysis parameter may also be used for analysis just like a filter. Here, the mapping details include at least one of a particular row, particular column and the like. In an exemplary embodiment, the user may also set the speed of analysis as well as type of analysis. In such exemplary embodiment, the type of analysis may be a full test or litmus test.

The data processing subsystem 20 also includes a suggestion module 60. The suggestion module 60 is operatively coupled to the analysis module 50. The suggestion module 60 is configured to suggest output based on the analysis result. In one embodiment, the analysis result comprises of sample mismatch data in the destination database, location of mismatch data in the destination database, the schedular information, and details of origin of mismatch data in the destination database.

Here, a user gets suggested results in user-friendly report format. In such embodiment, the user may incorporate the changes as required after reviewing the report.

Here, in one embodiment, the analysis result provides sample information regarding mismatch data in the destination database. In such embodiment, the sample information is colour coded with requisite number of mismatch result. In another embodiment, the analysis result also provides location of mismatch data in the destination database is also provided for further clarification by the datastore user.

In one embodiment, the analysis result also provides the analysis result according to predefined schedule time. In an exemplary embodiment, the schedular time may be fixed for hours or days. The analysis result also provides details of origin of mismatch data in the destination database to understand the root cause problem of any working related to database. In such embodiment, root cause analysis is performed for identifying the root causes of faults or problems.

Figure 2:
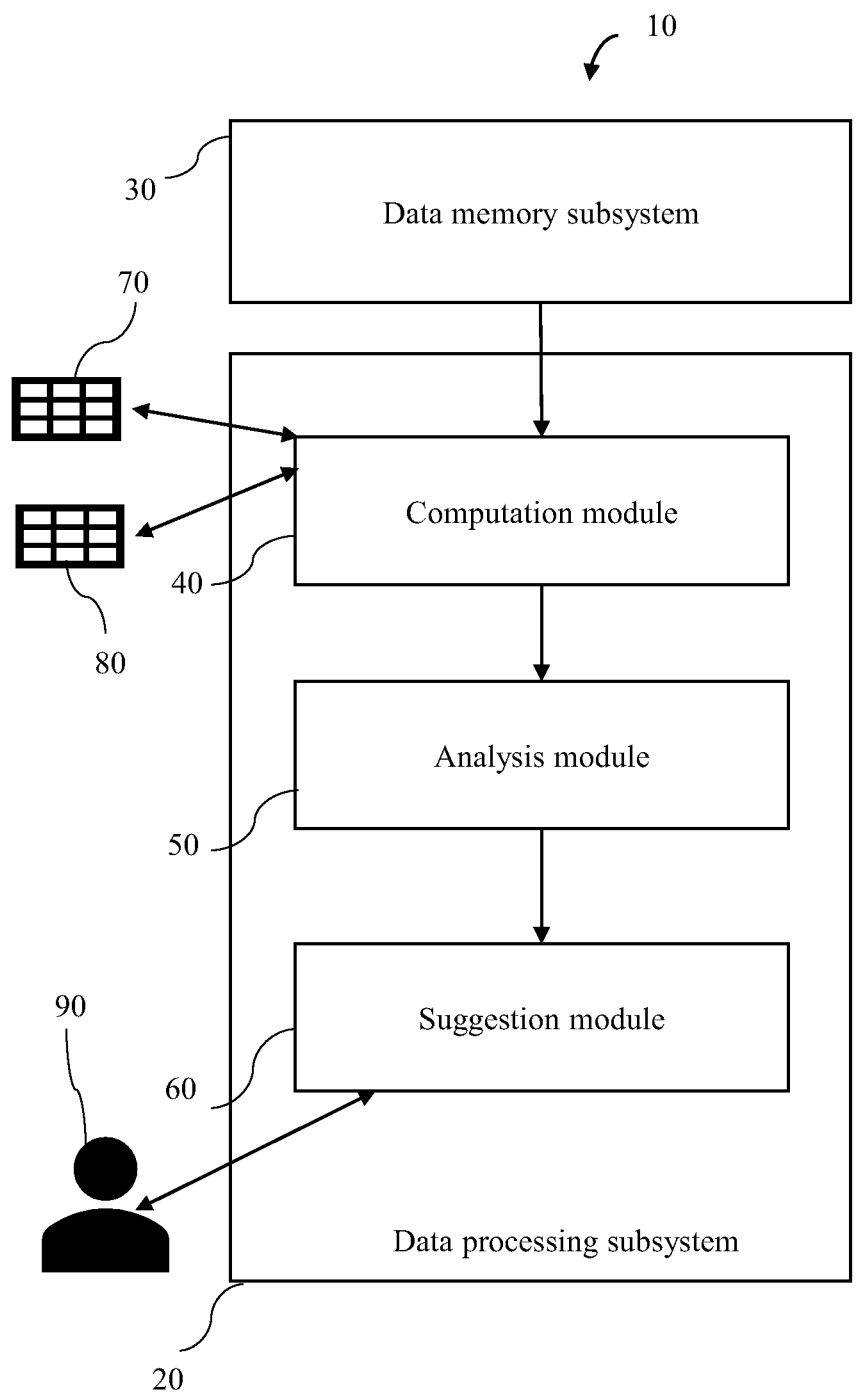
FIG. 2 is a schematic representation of an embodiment representing the system for data reconciliation of FIG. 1 in accordance of an embodiment of the present disclosure.

FIG. 2 is a schematic representation of an embodiment representing the system for data reconciliation 10 of FIG. 1 in accordance of an embodiment of the present disclosure. Here, a reference database 70 in TERADATA is copied to a destination database 80 in GOOGLE BIG QUERY.

The system 10 performs analysis for detection of problems regarding copied database. First, a computation module 40 generates hash values for a set of tables located in the reference database 70 in TERADATA by a hashing technique. The computation module 40 also generates hash values for a set of tables located in destination database 80 in GOOGLE BIG QUERY by the hashing technique.

In such exemplary embodiment, firstly all columns of one single row in a database is concatenated into a varchar. The varchar of the columns is then converted into a hash value. Secondly, all rows one aggregated hash value is calculated. Here, the hash value at various steps is calculated by usage of hashing techniques.

Further, an analysis module 50 enables analysis of the hash values located in the reference database 70 and the hash values located in the destination database 80 at a predetermined set time. For example, here analysis of two databases is performed after five hours of migration of data. After analysis, results are suggested according to the need of the user by a suggestion module 60. For example, the analysis result provides details of origin of mismatch data in the destination database 80 of GOOGLE BIG QUERY.

Here, the details comprise column number or row number and further details needed to understand the root cause of problem related to databases. Moreover, many details such as samples of mismatch data between the reference database 70 and the destination database 80 is also provided to a user X 90. Thus, the user X 90 may handle such problems with less manual interactions.

The computation module 40, the analysis module 50 and suggestion module 60 in FIG. 2 is substantially equivalent to the computation module 40, the analysis module 50 and suggestion module 60 of FIG. 1.

Figure 3:
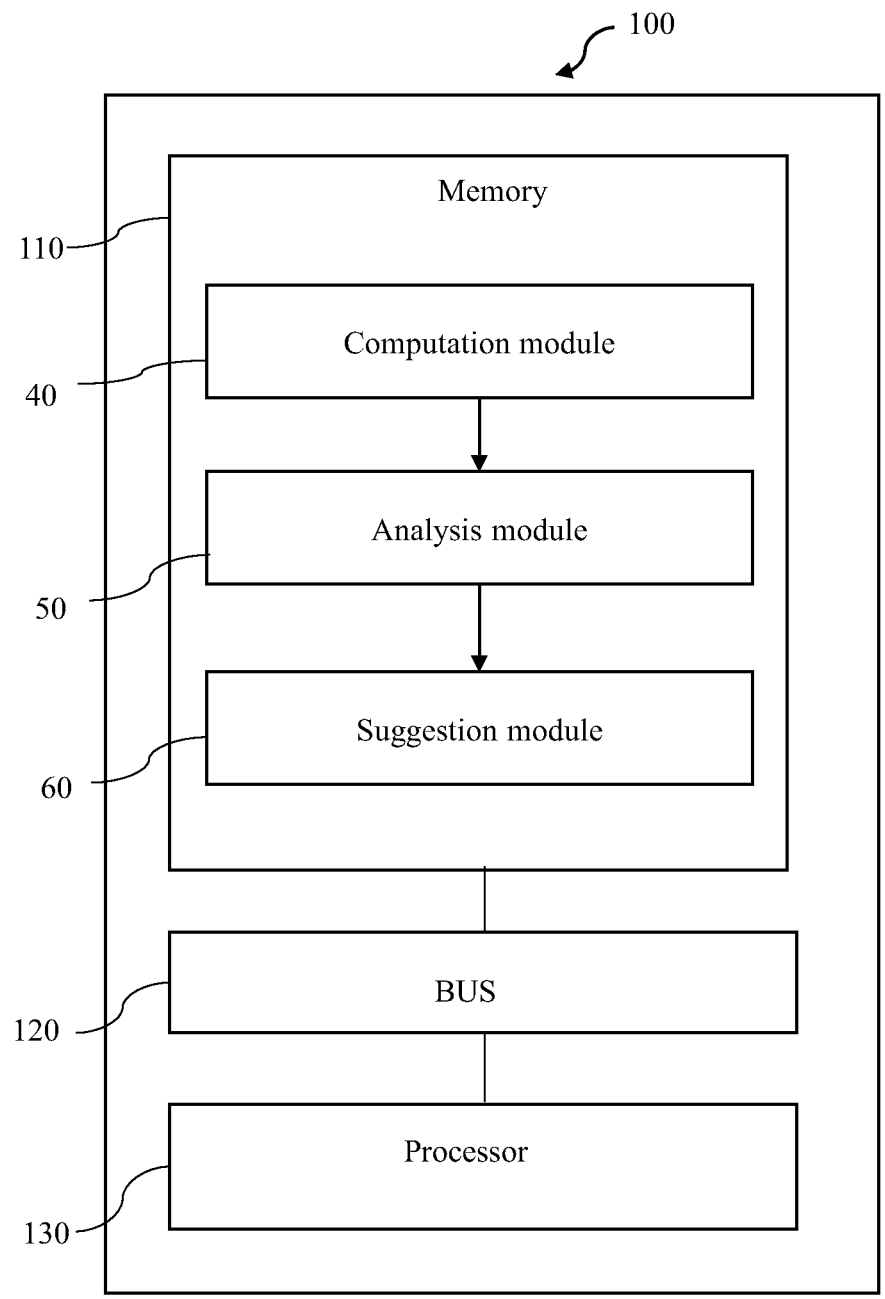
FIG. 3 is a block diagram of a computer or a server in accordance with an embodiment of the present disclosure.

FIG. 3 is a block diagram of a computer or a server 100 in accordance with an embodiment of the present disclosure. The server 100 includes processor(s) 130, and memory 110 coupled to the processor(s) 130.

The processor(s) 130, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 110 includes a plurality of modules stored in the form of executable program which instructs the processor 130 to perform the method steps illustrated in FIG. 1. The memory 110 has following modules: the computation module 40, the analysis module 50 and the suggestion module 60. The computation module 40 is configured to generate hash values for a set of tables located in a source database by a hashing technique. The computation module 40 is also configured generate hash values for a set of tables located in a destination database by the hashing technique.

The analysis module 50 is configured to analyse the hash values located in the source database and the hash values located in the destination database by a pre-determined rule. The suggestion module 60 is configured to suggest output based on the analysis result.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 130.

Figure 4:
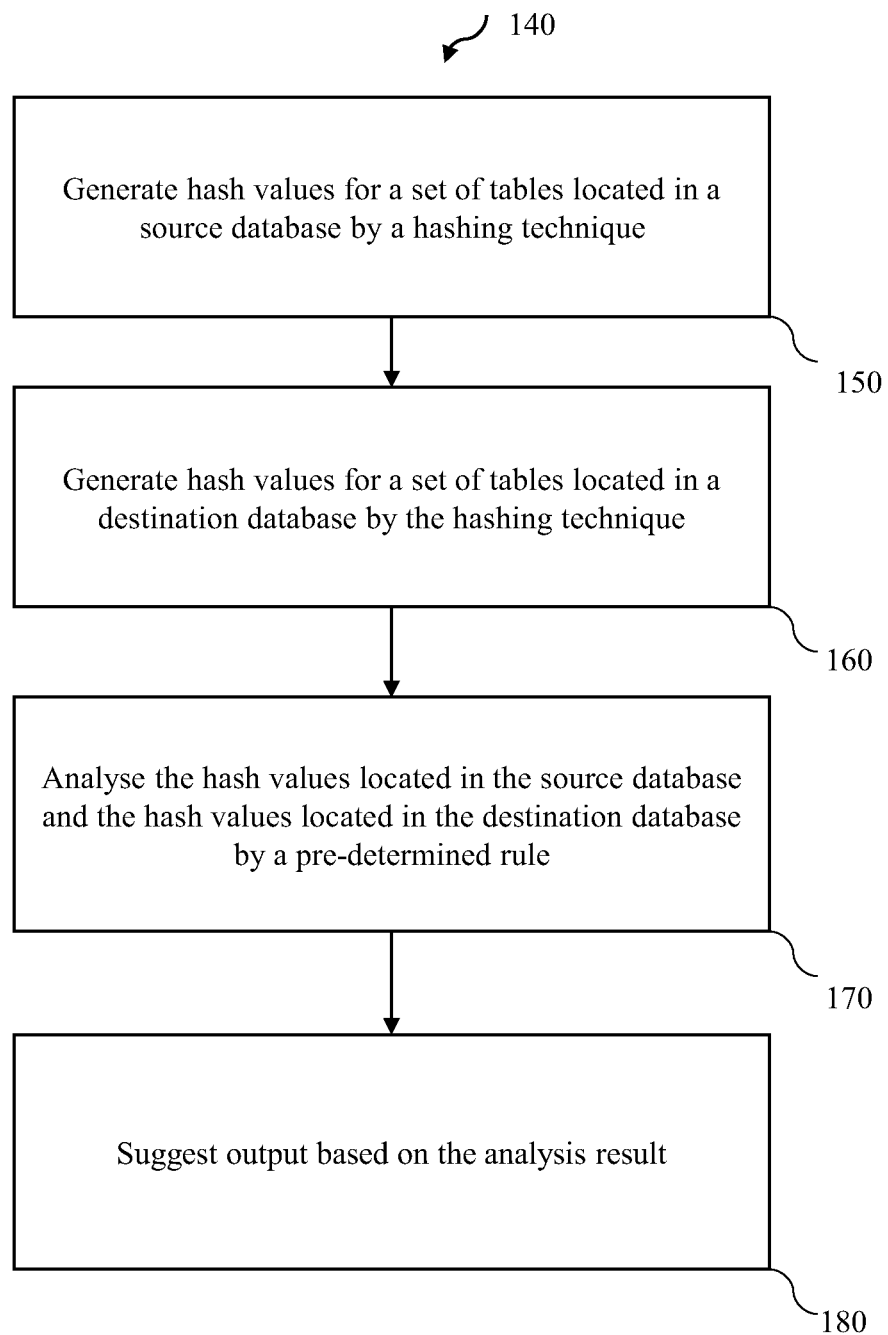
FIG. 4 is a flowchart representing the steps of a method for data reconciliation in accordance with an embodiment of the present disclosure.

FIG. 4 is a flowchart representing the steps of a method for data reconciliation 140 in accordance with an embodiment of the present disclosure. The method 140 includes generating hash values for a set of tables located in a source database by a hashing technique in step 150. In one embodiment, generating the hash values for the set of tables located in the source database by the hashing technique includes generating hash values for the set of tables located in the source database by a computation module.

The method 140 also includes generating hash values for a set of tables located in a destination database by the hashing technique in step 160. In one embodiment, generating the hash values for the set of tables located in the destination database by the hashing technique includes generating the hash values for the set of tables located in the destination database by the computation module.

The method 140 also includes analysing the hash values located in the source database and the hash values located in the destination database by a pre-determined rule in step 170. In one embodiment, analysing the hash values located in the source database and the hash values located in the destination database by the pre-determined rule includes analysing the hash values located in the source database and the hash values located in the destination database by an analysis module.

In another embodiment, analysing the hash values located in the source database and the hash values located in the destination database by the pre-determined rule includes analysing the hash values located in the source database and the hash values located in the destination database by the pre-determined rule comprising of scheduler information and mapping details from a user.

The method 140 also includes suggesting output based on the analysis result in step 180. In one embodiment, suggesting the output based on the analysis result includes suggesting the output based on the analysis result by a suggestion module. In another embodiment, suggesting the output based on the analysis result includes suggesting output based on the analysis result comprising sample mismatch data in the destination database, location of mismatch data in the destination database, the schedular information, and details of origin of mismatch data in the destination database.

The method 140 further comprises storing the generated hash values for the source database and the generated hash values for the destination database. In one embodiment, storing the generated hash values for the source database and the generated hash values for the destination database includes storing the generated hash values for the source database and the generated hash values for the destination database by a data memory subsystem.

Present disclosure of a system for data reconciliation provides an easy use of hashing techniques for comparing set of tables located in two different databases. Here, the present invention may be used easily when the two databases as discussed is located in two different data stores. Thus, enabling safe migration of data.

Further, many any attributes like samples of faults in the replicated data or a root cause analysis of the replicated data is also provided along analysis results. Row and column level validation are also provided by such system. Such, results reduce manual interference of human in detection of problems while managing databases.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A computer implemented system for data reconciliation, comprising:
   a processor; and
   a memory coupled to the hardware processor, wherein the memory comprises a set of program instructions in the form of a plurality of modules, configured to be executed by the hardware processor, wherein the plurality of modules comprises
   a data processing subsystem, comprising:
      a computation module, configured to:
         generate hash values for a set of tables located in a source database by a hashing technique;
         generate hash values for a set of tables located in a destination database by the hashing technique;
      a data memory subsystem operatively coupled to the data processing subsystem, and configured to store the generated hash values for the source database and the generated hash values for the destination database;
   wherein the data processing subsystem comprises:
      an analysis module operatively coupled to the computation module, and configured to analyse the hash values located in the source database and the hash values located in the destination database by a pre-determined rule, wherein the pre-determined rule as required for analysis comprises of scheduler information and mapping details from a user; and
      a suggestion module operatively coupled to the analysis module, and configured to suggest output based on the analysis result, wherein the analysis results comprises of sample mismatch data in the destination database, location of mismatch data in the destination database, the schedular information, and details of origin of mismatch data in the destination database, wherein in generating hash values in the source database and the destination database, the hardware processor is configured for:
      concatenating each column of one single row in the source database and the destination database into a varchar;
      converting the varchar of the columns into the hash values;
      calculating one aggregated hash value for all rows using the hashing technique; and
      aggregating each of the hash value to obtain a final hash value.

2. The computer implemented system of claim 1, wherein, the source database and the destination database are located at two different data stores.

3. The computer implemented system of claim 1, wherein the hashing technique used for calculating each of the hash value comprises of at least one of SHA-1, SHA-2, SHA-3, MD5, and computing fingerprinting.

4. The computer implemented system of claim 1, wherein the schedular information comprises the scheduled timeline, speed of analysis and type of analysis comprising at least one of a full test and litmus test set by the user; and wherein the mapping details comprises at least one of a particular row, and a particular column.

5. A computer implemented method for data reconciliation, comprising:
 a processor; and
 a memory coupled to the hardware processor, wherein the memory comprises a set of program instructions in the form of a plurality of modules, configured to be executed by the hardware processor, for
  generating, by a computation module, hash values for a set of tables located in a source database by a hashing technique;
  generating, by the computation module, hash values for a set of tables located in a destination database by the hashing technique;
  analysing, by an analysis module, the hash values located in the source database and the hash values located in the destination database by a pre-determined rule, wherein the pre-determined rule as required for analysis comprises of scheduler information and mapping details from a user;
 suggesting, by a suggestion module, output based on the analysis result, wherein suggesting comprises sample mismatch data in the destination database, location of mismatch data in the destination database, the schedular information, and details of origin of mismatch data in the destination database, wherein in generating hash values in the source database and the destination database, the hardware processor is configured for:
  concatenating each column of one single row in the source database and the destination database into a varchar;
  converting the varchar of the columns into the hash values;
  calculating one aggregated hash value for all rows using the hashing technique; and
  aggregating each of the hash value to obtain a final hash value.

6. The computer implemented method as claimed in claim 5, further comprises storing, by a data memory subsystem, the generated hash values for the source database and the generated hash values for the destination database.

7. The computer implemented method of claim 5, wherein, the source database and the destination database are located at two different data stores.

8. The computer implemented method of claim 5, wherein the hashing technique used for calculating each of the hash value comprises of at least one of SHA-1, SHA-2, SHA-3, MD5, and computing fingerprinting.

9. The computer implemented method as claimed in claim 5, wherein the schedular information comprises the scheduled timeline, speed of analysis and type of analysis comprising at least one of a full test and litmus test set by the user; and wherein the mapping details comprises at least one of a particular row, and a particular column.

\* \* \* \* \*